US012027022B2

(12) United States Patent
Neesan

(10) Patent No.: US 12,027,022 B2
(45) Date of Patent: Jul. 2, 2024

(54) WAR POKER

(71) Applicant: Neesan Labs LLC, Morton Grove, IL (US)

(72) Inventor: Ramsen Neesan, Morton Grove, IL (US)

(73) Assignee: Neesan Labs LLC, Morton Grove, IL (US)

( * ) Notice: Subject to any disclaimer, the term of this patent is extended or adjusted under 35 U.S.C. 154(b) by 0 days.

(21) Appl. No.: 18/204,484

(22) Filed: Jun. 1, 2023

(65) Prior Publication Data

US 2023/0306823 A1 Sep. 28, 2023

Related U.S. Application Data

(63) Continuation of application No. 17/898,599, filed on Aug. 30, 2022, now Pat. No. 11,704,981, which is a continuation of application No. PCT/US2021/030586, filed on May 4, 2021.

(60) Provisional application No. 63/019,758, filed on May 4, 2020.

(51) Int. Cl.
*G07F 17/32* (2006.01)

(52) U.S. Cl.
CPC ...... *G07F 17/3293* (2013.01); *G07F 17/3258* (2013.01); *G07F 17/3267* (2013.01)

(58) Field of Classification Search
CPC .. A63F 1/00; A63F 2001/005; A63F 3/00157; G07F 17/3293
USPC ....................................... 463/11-13; 273/292
See application file for complete search history.

(56) References Cited

U.S. PATENT DOCUMENTS

| | | | | |
|---|---|---|---|---|
| 5,294,128 | A | 3/1994 | Marquez | |
| 5,639,092 | A | 6/1997 | Macaisa | |
| 5,988,643 | A | 11/1999 | Awada | |
| 6,102,403 | A | 8/2000 | Kaufman | |
| 6,585,588 | B2 | 7/2003 | Hart | |
| 7,114,724 | B2 | 10/2006 | Ritzer et al. | |
| 8,998,694 | B2 | 4/2015 | Rowe | |
| 11,704,981 | B2 * | 7/2023 | Neesan | G07F 17/3267 463/13 |
| 2002/0113371 | A1 | 8/2002 | Snow | |
| 2003/0042679 | A1 | 3/2003 | Snow | |
| 2005/0275167 | A1 | 12/2005 | Wilson | |

(Continued)

OTHER PUBLICATIONS

International Search Report and Written Opinion for International Application No. PCT/US2021/030586 mailed Aug. 10, 2021.

*Primary Examiner* — Milap Shah
(74) *Attorney, Agent, or Firm* — RMCK Law Group PLC

(57) ABSTRACT

A method of playing a card game between a dealer and a player includes dealing first, third, fifth, seventh and ninth cards to the player. Second, fourth, sixth, eighth and tenth card are dealt to the dealer. A determination is made whether the first or second card has a higher value for a first point, whether the third or the fourth card has a higher value for a second point, whether the first, third and fifth combination of cards or the second, fourth and sixth combination of cards has a higher three-card stud poker hand for a third point, whether the seventh or eighth card has a higher value for a fourth point, and whether the first, third, fifth, seventh and ninth combination of cards or the second, fourth, sixth, eighth and tenth combination of cards has a higher five-card stud poker hand for a fifth point.

9 Claims, 8 Drawing Sheets

(56) References Cited

U.S. PATENT DOCUMENTS

| | | | |
|---|---|---|---|
| 2006/0027967 | A1 | 2/2006 | Chen |
| 2007/0155462 | A1 | 7/2007 | O'Halloran et al. |
| 2008/0026827 | A1 | 1/2008 | Skotarczak et al. |
| 2010/0013157 | A1 | 1/2010 | Marquez et al. |
| 2013/0095902 | A1 | 4/2013 | Smith et al. |
| 2014/0243064 | A1 | 8/2014 | Nicely et al. |

* cited by examiner

WAR POKER

CROSS REFERENCE TO RELATED APPLICATIONS

This application is a continuation of U.S. patent application Ser. No. 17/898,599 filed Aug. 30, 2022, which is a continuation of International Application No. PCT/US2021/030586 filed May 4, 2021, which claims the benefit of U.S. Provisional Application No. 63/019,758, filed May 4, 2020, the contents of which are incorporated herein by reference thereto.

FIELD

The present disclosure relates generally a card game involving playing cards and more particularly to a card game and related electronic game including portions of War, twenty-one, three-card stud poker, and five-card stud poker.

BACKGROUND

The card game of War is traditionally played by dealing a first card to a first player and a second card to a second player. The player having the highest value card is the winner of that hand. In the event of a tie, multiple cards are then dealt and the highest revealed card is the winner. Poker is another well-known card game. While many variants exist, two well-known versions include three-card stud poker and five-card stud poker. In three-card stud poker, the player with the highest value three-card poker hand is the winner. Similarly, in five-card stud poker, the player with the highest value five-card poker hand is the winner.

SUMMARY

A method of playing a card game between at least a dealer and a first player with a standard deck of cards is disclosed. A first card from the standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether the third card or the fourth card has a higher value. A second point is assigned to the respective recipient of the higher value card of the third and fourth cards. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the first player or the second, fourth, sixth, eighth and tenth combination of cards to the dealer has a higher five-card stud poker hand. A fifth point is assigned to the respective recipient of the higher five-card stud poker hand. A winner is determined between the first player and the dealer based on an accumulation of a majority of the first through fifth points.

According to additional features, an Action Cards deck of cards is provided. A determination is made whether a value of any of the first card, second card, third card, fourth card, seventh card or eighth card is equal to an actionable value. If it is determined that a value of any of the first, second, third, fourth, seventh or eighth card is equal to the actionable value, that card is assigned as an actionable card. An Action Card is selected from the Action Cards deck of cards for each actionable card based on a value of any of the first, second, third, fourth, seventh or eighth card being an actionable card. A value of the selected Action Card is added, subtracted or replaced relative to the respective actionable card. A value of the respective actionable card is reassigned. In one example, the actionable value is a card having a value of two.

A method of playing a card game between at least a dealer and a first player with a standard deck of cards according to additional features of the present disclosure is disclosed. A first card from the standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether a sum of the first and the third cards or a sum of the second and the fourth cards has a closer value to twenty-one. A second point is assigned to the respective recipient of the closer value to twenty-one combination. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the first player or the second, fourth, sixth, eighth and tenth combination of cards to the dealer has a higher five-card stud poker hand. A fifth point is assigned to the respective recipient of the higher five-card stud poker hand. A winner is determined between the first player and the dealer based on an accumulation of a majority of the first through fifth points.

In additional features, the closer value to twenty-one includes summed values below and over twenty-one wherein a Jack face card will be scored with an 11 value, a Queen face card will be scored with a 12 value, a King face card will be scored with a 13 value and an Ace card will be scored with a 14 value.

A method of playing a card game between at least a dealer and a first player with a standard deck of cards according to additional features of the present disclosure is disclosed. A first card from the standard deck of cards is selected and assigned to the first player. A second card from the standard deck of cards is selected and assigned to the dealer. A third card is selected from the standard deck of cards and assigned to the first player. A fourth card from the standard deck of cards is selected and assigned to the dealer. A determination is made whether a sum of the first and the third cards or a sum of the second and the fourth cards has a closer value to twenty-one. A first point is assigned to the respective recipient of the closer value to twenty-one combination. A fifth card from the standard deck of cards is selected and assigned to the first player. A sixth card from the standard deck of cards is selected and assigned to the dealer. A seventh card from the standard deck of cards is selected and assigned to the first player. An eighth card from the standard deck of cards is selected and assigned to the dealer. A ninth card from the standard deck of cards is selected and assigned to the first player. A tenth card from the standard deck of cards is selected and assigned to the dealer. A determination is made whether the fifth, seventh and ninth combination of cards to the player or the sixth, eighth and tenth combination of cards to the dealer has a higher three-card stud poker hand. A second point is assigned to the respective recipient of the higher three-card stud poker hand. A determination is made whether the first, third, fifth, seventh and ninth combination of cards to the player or the second, fourth, sixth, eighth and tenth combination of cards to the dealer has a higher five-card stud poker hand. A third point is assigned to the respective recipient of the higher five-card stud poker hand. A winner is determined between the first player and the dealer based on an accumulation of a majority of the first through third points.

A game system according to additional features of the present disclosure is provided. The game system includes a game module having a computer readable medium configured to execute instructions. A first card from a standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether the third card or the fourth card has a higher value. A second point is assigned to the respective recipient of the higher value card of the third and fourth cards. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the first player or the second, fourth, sixth, eighth and tenth combination of cards to the dealer has a higher five-card stud poker hand. A fifth point is assigned to the respective recipient of the higher five-card stud poker hand. A winner is determined between the first player and the dealer based on an accumulation of a majority of the first through fifth points.

According to additional features, the game module is further configured to provide an Action Cards deck of cards. A determination is made whether a value of any of the first card, second card, third card, fourth card, seventh card or eighth card is equal to an actionable value. If it is determined that a value of any of the first, second, third, fourth, seventh or eighth card is equal to the actionable value, that card is assigned as an actionable card. An Action Card is selected from the Action Cards deck of cards for each actionable card based on a value of any of the first, second, third, fourth, seventh or eighth card being an actionable card. A value of the selected Action Card is added, subtracted or replaced relative to the respective actionable card. A value of the respective actionable card is reassigned. In one example, the actionable value is a card having a value of two.

A non-transitory computer readable medium including instructions executable by a control circuit for a computer system is provided. A first card from a standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether the third card or the fourth card has a higher value. A second point is assigned to the respective recipient of the higher value card of the third and fourth cards. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the first player or the second, fourth, sixth, eighth and tenth combination of cards to the dealer has a higher five-card stud poker hand. A fifth point is assigned to the respective recipient of the higher five-card stud poker hand.

A winner is determined between the first player and the dealer based on an accumulation of a majority of the first through fifth points.

According to additional features, the non-transitory computer readable medium provides an Action Cards deck of cards. A determination is made whether a value of any of the first card, second card, third card, fourth card, seventh card or eighth card is equal to an actionable value. If it is determined that a value of any of the first, second, third, fourth, seventh or eighth card is equal to the actionable value, that card is assigned as an actionable card. An Action Card is selected from the Action Cards deck of cards for each actionable card based on a value of any of the first, second, third, fourth, seventh or eighth card being an actionable card. A value of the selected Action Card is added, subtracted or replaced relative to the respective actionable card. A value of the respective actionable card is reassigned. In one example, the actionable value is a card having a value of two.

A game system according to additional features of the present disclosure is provided. The game system includes a game module having a computer readable medium configured to execute instructions. A first card from a standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether a sum of the first and the third cards or a sum of the second and the fourth cards has a closer value to twenty-one. A second point is assigned to the respective recipient of the closer value to twenty-one combination. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the player or the second, fourth, sixth, eighth and tenth combination of cards to the dealer has a higher five-card stud poker hand. A fifth point is assigned to the respective recipient of the higher five-card stud poker hand. A winner is determined between the first player and the dealer based on an accumulation of a majority of the first through fifth points.

A non-transitory computer readable medium including instructions executable by a control circuit for a computer system is provided. A first card from a standard deck of cards is selected and assigned to the first player. A second card from the standard deck of cards is selected and assigned to the dealer. A determination is made whether the first card or the second card has a higher value. A first point is assigned to the respective recipient of the higher value card of the first and second cards. A third card is selected from the standard deck of cards and assigned to the first player. A fourth card from the standard deck of cards is selected and assigned to the dealer. A determination is made whether a sum of the first and third cards or a sum of the second and fourth cards has a closer value to twenty-one. A second point is assigned to the respective recipient of the summed cards closer to twenty-one. A fifth card from the standard deck of cards is selected and assigned to the first player. A sixth card from the standard deck of cards is selected and assigned to the dealer. A determination is made whether the first, third and fifth combination of cards to the first player or the second, fourth and sixth combination of cards to the dealer has a higher three-card stud poker hand. A third point is assigned to the respective recipient of the higher three-card stud poker hand. A seventh card from the standard deck of cards is selected and assigned to the first player. An eighth card from the standard deck of cards is selected and assigned to the dealer. A determination is made whether the seventh card or the eighth card has a higher value. A fourth point is assigned to the respective recipient of the higher value card of the seventh and eighth cards. A ninth card from the standard deck of cards is selected and assigned to the first player. A tenth card from the standard deck of cards is selected and assigned to the dealer. A determination is made whether the first, third, fifth, seventh and ninth combination of cards to the first player or the second, fourth, sixth, eighth and tenth combination of cards to the dealer has a higher five-card stud poker hand. A fifth point is assigned to the respective recipient of the higher five-card stud poker hand. A winner is determined between the first player and the dealer based on an accumulation of a majority of the first through fifth points.

BRIEF DESCRIPTION OF THE DRAWINGS

The present disclosure will become more fully understood from the detailed description and the accompanying drawings, wherein.

DETAILED DESCRIPTION

Figure 1:
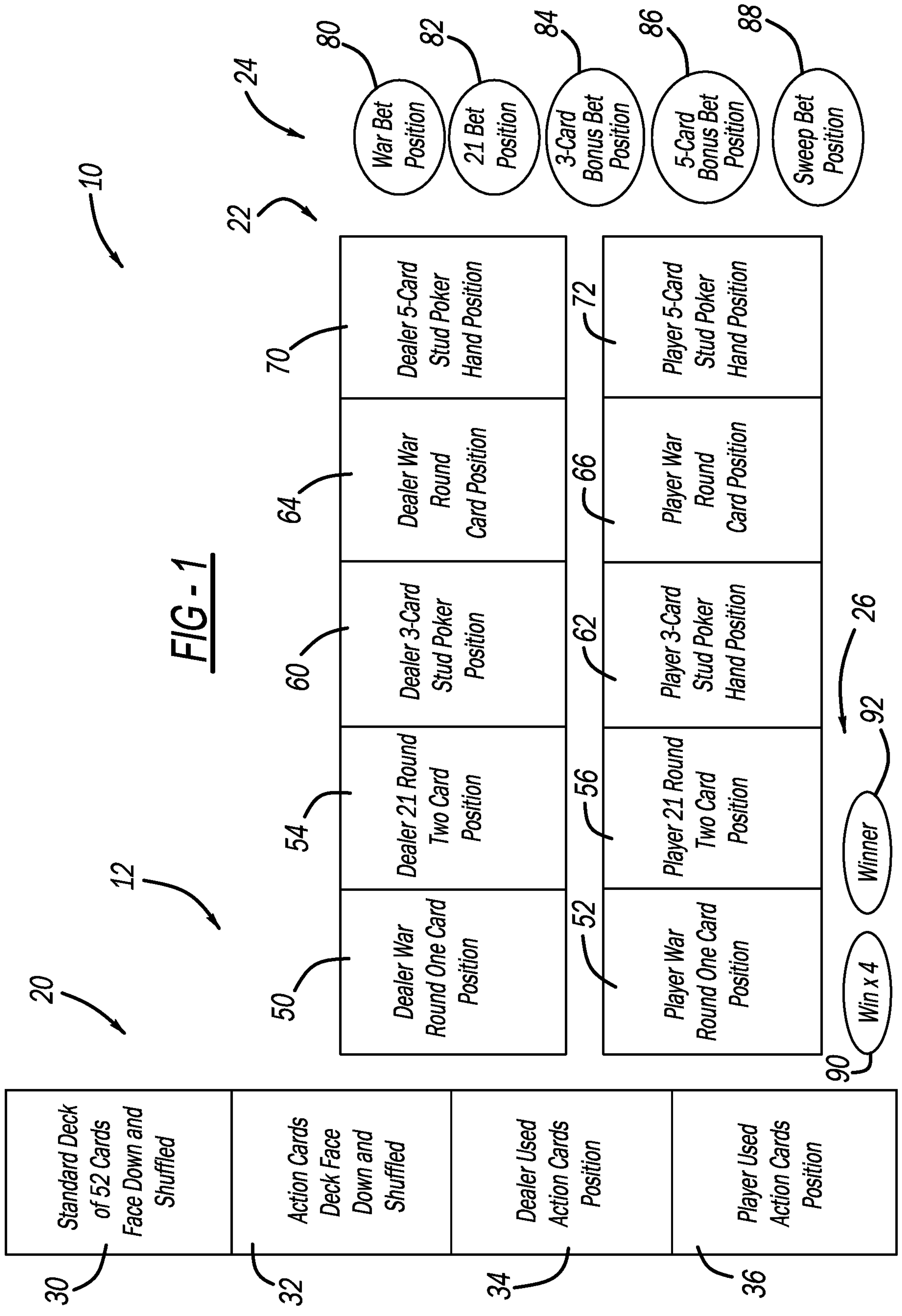
FIG. 1 is a plan view of the War Poker game table before playing cards are dealt.

Reference will now be made in detail to examples of the present disclosure. It will be understood that the following examples are not intended to limit the disclosure. On the contrary, the instant disclosure is intended to cover alternatives, modifications and equivalents, which may be included within the spirit and scope of the disclosure.

As will be described in greater detail herein, the present disclosure provides unique card games with unique rules that can be adapted for play as a physical game or a virtual game. In this regard, the card games can be played with physical cards, such as on a game table or virtually, such as on a phone, tablet or computer. Furthermore, the card games may also be played on various casino machines, such as slot machines, video poker and the like. As will be described herein, War Poker includes multiple game modes including wagering (gambling) and non-gambling. It will be appreciated that the following disclosure encompasses methods of playing a card game in addition to application software programmed to execute the playing of the card game on a physical casino machine or virtually by way of a computer, tablet or mobile device.

In the following description, numerous specific details are set forth to provide a thorough understanding of the presently disclosed technology. In other examples, the techniques introduced here can be practiced without these specific details. In other instances, well-known features, such as specific functions or routines, are not described in detail in order to avoid unnecessarily obscuring the present disclosure. References in this description to an "example", "one example", or similar terms with "example" mean that a particular feature, structure, material, or characteristic being described is included in at least one example of the present disclosure. The appearances of such phrases in this specification do not necessarily all refer to the same example. On the other hand, such references are not necessarily mutually exclusive. Furthermore, the particular features, structures, materials, or characteristics can be combined in any suitable manner in one or more examples.

It is to be understood that the various examples shown in the figures are merely illustrative representations. Further, the drawings showing examples of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Several details describing structures or processes that are well-known and often associated with computer systems and subsystems, but that can unnecessarily obscure some significant aspects of the disclosed techniques, are not set forth in the following description for purposes of clarity. Moreover, although the following disclosure sets forth several examples of different aspects of the present technology, several other examples can have different configurations or different components than those described in this section. Accordingly, the disclosed techniques can have other examples with additional elements or without several of the elements described below.

Many examples or aspects of the present disclosure described below can take the form of computer-executable or controller-executable instructions, including routines executed by a programmable computer or controller or electronic devices. Those skilled in the relevant art will appreciate that the disclosed techniques can be practiced on electronic or computer or controller systems other than those shown and described below. The techniques described herein can be embodied in a special-purpose electronic or computer or data processor that is specifically programmed, configured, or constructed to execute one or more of the computer-executable instructions described below. Accordingly, the terms "computer" and "controller" as generally used herein refer to any data processor and can include servers, distributed computing systems, cloud computing, Internet appliances, and handheld devices, including palmtop computers, wearable computers, cellular or mobile phones, multi-processor systems, processor-based or programmable consumer electronics, network computers, mini computers, and the like. Information handled by these computer systems and computers and controllers can be presented at any suitable display medium, including a liquid crystal display (LCD). Instructions for executing electronic- or computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular examples, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

The following examples are described in sufficient detail to enable those skilled in the art to make and use the invention. It is to be understood that other examples would be evident based on the present disclosure, and that system, process, or mechanical changes may be made without departing from the scope of an example of the present invention.

The term "module" or "unit" referred to herein can include software, hardware, mechanical mechanisms, or a combination thereof in an example of the present invention, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof. Further, if a "module" or "unit" is written in the system claims section below, the "module" or "unit" is deemed to include hardware circuitry for the purposes and the scope of the system claims.

War Poker is an exciting new game combining multiple card games, war, twenty-one, three-card stud poker, and five-card stud poker. The basic game rules follow war but adds in twenty-one and made poker hands at distinct rounds which follow the three-card stud poker and five-card stud poker hand ranking systems. In addition to the base play there is an addition of Action Cards that optimize game play and entertainment value.

In War Poker, the objective of the game is for the player(s) to beat the dealer in a best-of-five rounds of heads-up play. Each won round will result in one point for the victor. Rounds one and four will consist of war play where the higher valued dealt card wins the round. Round two will consist of twenty-one play, where the combination of cards in round one and two are tallied for a combined value. The combination of cards closest to the value of twenty-one wins the round. In an alternate form of War Poker, round two can consist of another war play round. The winner of round three is determined by the higher three-card stud poker hand between player and dealer. The winner of the fifth round is determined by the higher five-card stud poker hand between player and dealer. All war ties and poker push hands go to the dealer. Whoever wins best-of-five rounds wins War Poker.

The game mechanics will follow traditional dealer versus Player(s) card games in which cards will be dealt from the dealer's deck to each participating Player(s). There is also a deck of Action Cards that are separate from the standard main deck that will be utilized at certain points of the gameplay as required.

The War rounds will now be described. The game of War is a high-card comparison between the dealer and Player(s). The numeric values and scoring are predetermined prior to the game beginning. The dealer deals a card to a Player(s) and one to themselves. The dealer then compares their card to the Player(s) cards and whoever has the highest value wins the round according to the predetermined and agreed upon point values and rules. As identified above, War Poker can have two total War rounds (rounds one, and four), three total War rounds (rounds one, two and four) or five total war rounds (rounds one, two, three, four, and five) out of five total rounds per one game session.

The first round of War Poker is a War round. This round is a high-card comparison between the dealer and the player(s). The numeric values and the scoring are predetermined prior to the game beginning. The dealer deals a card to each player and one to themselves. The dealer then compares their round one card to each player's round one card. Whoever has the highest value according to the predetermined and agreed upon point values and rules wins round one. If there is a tie value outcome, where both the dealer and the identified player has the same valued card, the dealer is awarded the victory for round one.

The second round of War Poker is a Twenty-One round. In the Twenty-One round, a two-card valued comparison between the dealer and the player is made. The numeric values and scoring are predetermined prior to the game beginning. After round one, the dealer deals a card to each player and one to themselves. At this point there are two cards displayed for each of the dealer and respective player. The dealer then compares their two cards to the respective player's two cards and whoever has the highest value closer to the value of twenty-one wins round two according to the predetermined and agreed upon point values and rules. In War Poker, both the dealer and the player may go over a twenty-one value as there is no penalty in doing so such as the "bust" concept in traditional blackjack. If there is a tie value outcome, where both the dealer and respective player have the same valued card combination, the dealer will be awarded victory for round two. As identified above, a variation of round two can be another stand-alone War round where the highest card is awarded victory.

The third round of War Poker is the three-card Stud Poker round. After round two, the dealer deals a card to each player and one to themselves. By this round, both the dealer and the respective players each have three cards dealt in the game. The game combines the three cards as one three-card stud poker hand and the point goes to whoever has the highest hand according to the hand rankings predetermined and agreed upon values and rules wins round three. If the player and the dealer have three-card stud poker hands that tie in rank, the third round point goes to the dealer.

The fourth round of War Poker is a War round. This round is a high-card comparison between the dealer and each respective player. The numeric values and the scoring are predetermined prior to the game beginning. After round three, dealer deals a card to each player and one to themselves. The dealer then compares their round four card to each player's round four card. Whoever has the highest value according to the predetermined and agreed upon point values and rules wins round four. If there is a tie value outcome, where both the dealer and the identified player has the same valued card, the dealer is awarded the victory for round four.

The fifth and final round of War Poker is the five-card stud poker round. After round four, the dealer deals a card to each player and one to themselves. By this round, both the dealer and the respective players each have five total cards dealt in the game. The game combines the five cards as one five-card stud poker hand and the point goes to whoever has the highest hand according to the hand rankings predetermined and agreed upon wins round five. If the player and the dealer have five-card stud poker hands that tie in rank, the fifth round point goes to the dealer.

The Action Cards will now be described. At predetermined and agreed upon steps in the game there will be an opportunity to draw from an Action Cards deck. Action Cards are separate from the standard deck and provide actionable features or buffers to the current round that they are drawn upon and used.

War Poker betting mechanics according to one example of the present disclosure will now be described. For Casino/"house"/money bank/or other betting implementations of the game there will be betting mechanics applied. Betting mechanics do not impact the Game Rules but offer another option to play the game in a chance manner to win bets placed. There will be bet positions for War Bet (Ante), 21 Bet, three-card Stud Poker Payout Bet, five-card Stud Poker Payout Bet, and Sweep Bet.

War Bet is the Ante bet and required to be placed for the player to participate in the game in the betting format. The player must win at least three rounds to win the bet. The payout on winning this bet will be determined by the hosting entity of the game according to their rules and pay table.

In gambling, a "proposition bet" (prop bet, prop, novelty, or a side bet) is a bet made regarding the occurrence or non-occurrence during a game (usually a gambling game) of an event not directly affecting the game's final outcome. The following are proposition bets in War Poker.

War Poker 21 bet is a proposition or prop bet. If the bet is placed, the player wins if they have exactly the value twenty-one at the conclusion of the second round of the game. Card values will be determined by the house and displayed for all participants of the game. If the participating players' first two cards do not have exactly the value of twenty-one at the end of the game, the participating player will lose the 21 bet. Payouts will vary by the house or hosted game entity.

The three-card stud poker payout bet will be described. Three-card stud poker payout bet is a proposition (prop) bet. The following are the rankings in decreasing value for the eligible hands to win this bet. Payouts will be determined by the hosting entity.

Straight flush—three consecutive cards of the same suit. (highest hand possible) One example of a straight flush:

A (Ace)♦, King of Diamonds (K♦), Queen of Diamonds (Q♦)

Three-Of-A-Kind—three of the same card. Suit does not matter. (All Aces is the highest rank Three-of-a-Kind) One example of a Three-of-a-Kind:

A (Ace)♦, A (Ace)♦, A (Ace)♦

Straight—three consecutive cards of mixed suits. (Queen, King, Ace is the highest rank Straight) One example of a Straight:

Ace(A)♦, King of Clubs (K♣), Queen of Diamonds (Q♦)

Flush—three cards of the same suit. (Flush with at least one Ace(s) is the highest rank Flush) One example of a Flush:

A (Ace)♦, 3♦, 6♦

Pair—two of the same cards. Suit does not matter. (Pair of Aces is the highest Pair rank) One example of a Pair:

A (Ace)♦, A (Ace)♥, 2♠

High Card. (High card is the lowest ranking poker hand) (Ace is the highest ranked card of the High Card result)

One example of high-card:

A (Ace)♥, Jack of Clubs (J♣), 8♠

If a player does not qualify for a three-card stud payout hand, the player will lose the three-card stud poker payout bet.

The five-card stud poker payout bet will be described. The five-card stud poker payout bet is a proposition (prop) bet.

If a bet is placed, the complete five rounds will be dealt/exposed even in an event of a Sweep or 3-1 victory to either player or dealer.

The following are the rankings for the eligible hands to win this bet. The following are the rankings in decreasing value for the eligible hands to win this bet. Payouts will be determined by the hosting entity.

Royal Flush—Ace, King, Queen, Jack, and 10, all the same suit. One example of Royal Flush:

A (Ace)♦, King of Diamonds (K♦), Queen of Diamonds (Q♦), Jack of Diamonds (J♦), 10♦

Straight Flush—five cards in a sequence, all in the same suit. One such example of a Straight Flush:

8♣, 7♣, 6♣, 5♣, 4♣

Four of a Kind—four of the same cards. Suit does not matter. One example of a Four of a Kind:

Jack of Hearts (J♥), Jack of Diamonds (J♦), Jack of Spades (J♠), Jack of Clubs (J♣), 7♦

Full House—three of a kind with a pair. One example of a Full House:

10♥, 10♦, 10♠, 9♣, 9♦

Flush—any five cards of the same suit, but not in a sequence. One example of a Flush:

4♠, Jack of Spades (J♠), 8♠, 2♠, 9♠

Straight—five cards in a sequence, but not of the same suit. One example of a Straight:

9♣, 8♦, 7♠, 6♦, 5♥

Three of a Kind—three of the same cards. Suit does not matter. One example of a Three of a Kind:

7♣, 7♦, 7♠, King of Clubs (K♣), 3♦

Two Pairs—two different pairs. One example of Two Pairs:

4♣, 4♠, 3♣, 3♦, Queen of Clubs (Q♦)

Pair—two of the same cards. One example of a Pair:

A (Ace)♥, A (Ace)♦, 8♣, 4♠, 7♥

High Card—when the player and/or dealer have not made any of the hands above, the highest card plays (is evaluated).

In the example below, the Ace as the highest card available.

3♦, 8♠, 4♥, 2♠, A (Ace)♥

If a player does not qualify for a five-card stud payout hand, the player will lose the five-card stud poker payout bet.

A Sweep Bet will now be described. A Sweep Bet is a proposition (prop) bet. If a sweet bet is placed and the respective player has won all five rounds in the game, they will win the Sweep Bet. If a sweep bet is placed, the play will continue even in the event of a 3-0 win by the respective player. If the respective player does not meet the criteria of a Sweep Bet, the player will lose the Sweep Bet.

The game can be played without the betting mechanics applied. In this form, the game will be played according to the Game Rules stated below and no bets, monies or currency will be exchanged or betted against.

The following are the game rules for War Poker. The rules apply to both physical and virtual/video game/computer software versions of the game. The game is played between a designated dealer (or "House") and a player or players. In one non-limiting example, a total of 8 players is maximum per one game session.

The number of decks will now be described. The game rules in this document reflect one standard physical paper (or other material) deck and one physical paper (or other material) Action Card deck. Multiple decks can be added as needed. Virtual instances of decks can be represented in software/computer game versions of this game. The game will be played with one standard card deck (Main Deck) containing fifty-two cards (traditional). No Jokers or other wild cards will play in this game.

The cards in one standard deck will include the following:

A (Ace)♥, 2♥, 3♥, 4♥, 5♥, 6♥, 7♥, 8♥, 9♥, 10♥, Jack of Clubs (J♥), Queen of Clubs (Q♥, King of Clubs (K♥), A (Ace)♦, 2♦, 3♦, 4♦, 5♦, 6♦, 7♦8♦, 9♦, 10♦, Jack of Diamonds (J♦), Queen of Diamonds (Q♦), King of Diamonds (K♦), A (Ace)♥, 2♥, 3♥, 4♥, 5♥, 6♥, 7♥, 8♥, 9♥, 10♥, Jack of Hearts (J♥), Queen of Hearts (Q♥), King of Hearts (K♥), A (Ace)♠, 2♠, 3♠, 4♠, 5♠, 6♠, 7♠, 8♠, 9♠, 10♠, Jack of Spades (J♠), Queen of Spades (Q♠), and King of Spades (K♠)

The game will include an Action Card deck comprising of multiple actionable items stated on the cards. Action Cards can be added or updated per game rules.

The current four Action Cards are: +3, which adds 3 points to the card drawn; +5, which adds 5 points to the card drawn; +8 which adds 8 points to the card drawn; and +12 which adds 12 points to the card drawn. In alternate gameplay, the above identified points can replace the points assigned to the originally card drawn. Action Card values will be determined by the hosing entity of the game and can be variable. For example, a hosting entity can determine that an Action Card may be triggered based on the drawing of any value card. In this regard, it can be predetermined, based on the hosting entity, which drawn cards trigger an Action card and further what value results from the receipt of an Action Card. An Action Card therefore can be customizable and/or variable based on the predetermined rules of the hosting entity.

The dealer and/or house must obtain cards to begin gameplay. All players must be identified and seated and/or available and attentive before, during, and after gameplay. To start the game, the dealer will manually shuffle the standard and action decks before the very first game is played. Depending on how many players, if one or less than one deck remains, will need to reshuffle the decks prior to playing game.

The following rules apply to betting rounds if applicable to the agreed upon gameplay rules. If betting, a player must place a War Bet (Ante) to participate in game. Additionally, if betting, a player may place optional proposition bets prior to game starting.

The following are the values given to the cards for each round deemed a "War" round and each round deemed a "twenty-one" round during gameplay. All number cards will be scored according to their displayed value (i.e. 2 will be scored a value of 2, 3 will be scored a value of 3, etc.). The Jack face card will be scored as 11. The Queen face card will be scored as 12. The King face card will be scored as 13. The Ace card will be scored a value of 14. Card suits do not affect the point value of each card.

With initial reference to FIG. 1, a War Poker game table layout according to one example of the present disclosure is shown and generally identified at reference numeral 10. The War Poker game table layout 10 can include a table surface 12 having a plurality of card storage positions 20, a plurality of card play positions 22, a plurality of bet positions 24 and a pair of win positions 26. The plurality of card storage positions 20 include a pre-play deck position 30, a pre-play action position 32, a post-play dealer used action position 34 and a post-play player used action position 36. The pre-play deck position 30 can identify a location where a standard deck of 52 cards are positioned face down and shuffled. The pre-play action position 32 can identify a location where Action Cards are positioned face down and shuffled. The post-play dealer used action position 34 can identify a location where dealer used Action Cards are discarded. The post-play player used action position 36 can identify a location where player used Action Cards are discarded.

The card play positions 22 will now be described. The card play positions 22 can include a dealer war round one card position 50, a player war round one card position 52, a dealer 21 round two card position 54, a player 21 round two card position 56, a dealer three-card stud poker position 60, a player three-card stud poker position 62, a dealer war round three card position 64, a player war round three card position 66, a dealer five-card stud poker hand position 70 and a player five-card stud poker hand position 72.

The bet positions 24 will now be described. The bet positions 24 can include a war bet position 80, a 21 bet position 82, a three-card bonus bet position 84, a five-card bonus bet position 86 and a sweep bet position 88. The win position 26 includes a "winner" position 90 and a "win×4" position 92. Four "win" markers are provided. One marker will be placed for each win per round for either the player or dealer. One "winner" marker will be placed for the final winner of the game. Prior to starting a game, all decks are to be shuffled. While the "winner" position 90 and "win×4" position 92 are shown in FIG. 1, they have been removed from subsequent figures for clarity with the understanding that these markers can be permanently displayed on the table surface 12.

Figure 2:
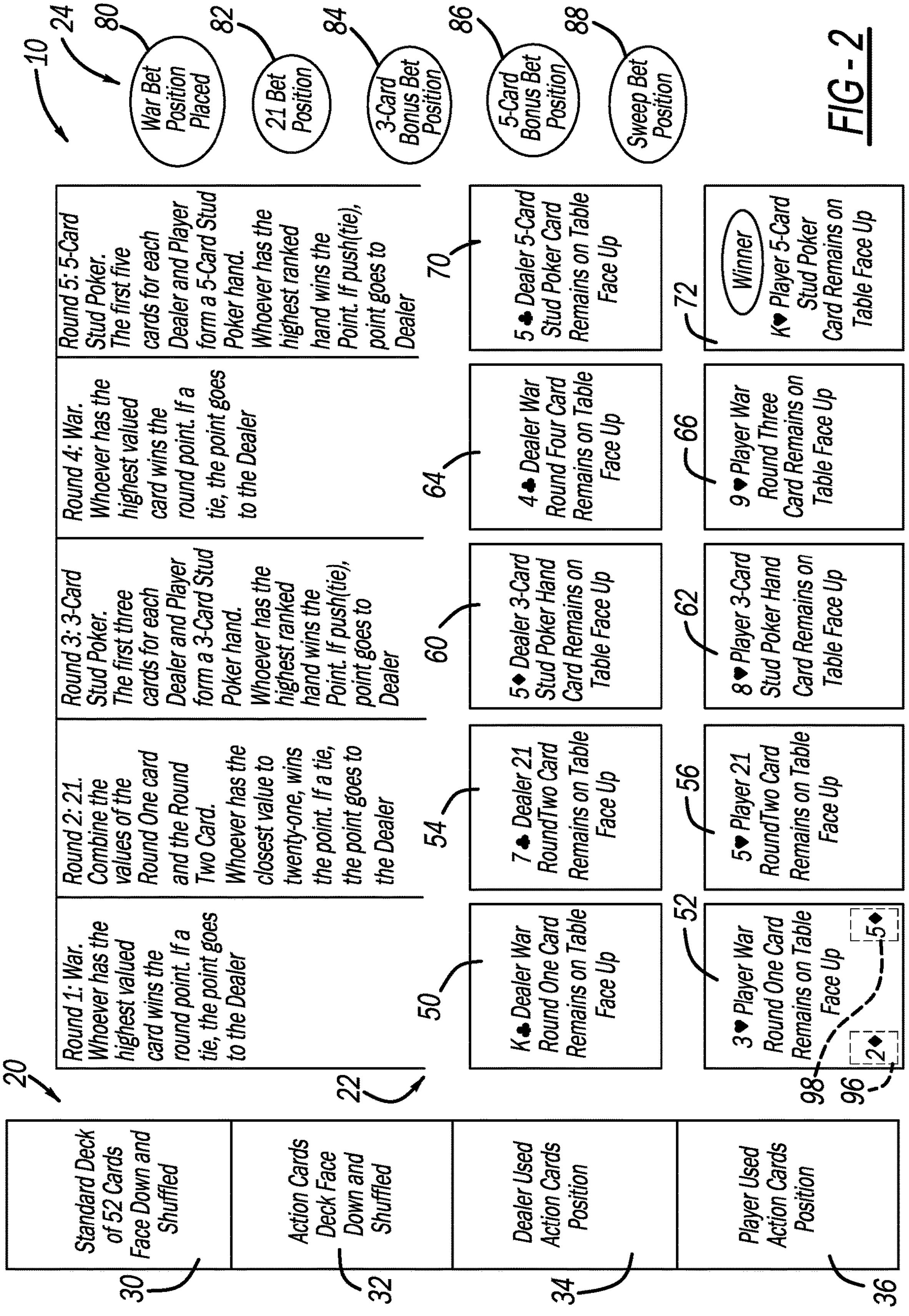
FIG. 2 is a plan view of the War Poker game table of FIG. 1 subsequent to a first five round version of play including a first war round, a twenty-one round, a three-card stud poker round, a second war round, and a five-card stud poker round.

Turning now to FIG. 2, an exemplary sequence of playing War Poker according to a first example will be described. In the example shown in FIG. 5, five rounds are played. The dealer will deal cards to the participating players starting from their left-most position and end at the right-most position.

At predetermined and agreed upon steps in the game there will be an opportunity to draw from the Action Cards at position 32. It is contemplated that, as described above, if the player or the dealer receives a 2-value card, they are entitled to supplement that 2-value with a newly drawn Action Card from position 32. The war bet is the Ante bet, placed at position 80. The Ante bet is required to be placed for the player to participate in the game in the betting format. The player must win at least three rounds to win the bet. The payout on a winning bet will be determined by the hosting entity of the game according to their rules and pay table. Various proposition bets may be placed prior to game play. In this regard, once game play starts, no more proposition bets can be placed by the player until a new game begins. Example proposition bets available for the War Poker game of FIG. 2 include a 21 bet, a three-card bonus bet, a five-card bonus bet, and a sweep bet. Such bets can be placed at positions 82, 84, 86, and 88, respectively.

An example round one will now be described. One card is dealt to a first player at the player war round one card position 52 from the pre-play deck position 30 and another card is dealt to the dealer at the dealer war round one card position 50 from the pre-play deck position 30. In the example shown, a 3 of hearts is revealed at position 52 while a king of clubs is revealed at position 50. Because the card at position 50 (king of clubs) is greater than the card at position 52 (3 of hearts), the dealer wins round one and round one ends. If the result is the same card value, the victory goes to the dealer. If either the player or dealer was alternatively dealt a 2 value card, an Action Card play will be triggered. As such, the dealer will draw a new card from the pre-play action position 32 and apply the Action Card to the 2 value card (player's and/or dealer's). The Action Card value is added to the 2 value card and the resulting sum is the total value for either the player or the dealer (instead of just a 2 value). By way of example, if the player were dealt a 2 value card 96 at position 52, the dealer will draw a new Action Card 98 from the pre-play position 32. In the example, shown, the new Action Card 98 is a 5 value card. Therefore, the net sum value for the player in round one is 7 (2 value card plus 5 value card). For this alternate example, the 7 value is less than the king value and the dealer wins round one. It will be appreciated that while the Action Card example is shown only for round one, an Action Card may be triggered (such as by receiving a 2-value card) for any of the war rounds or the 21 round.

In one alternative scenario, should a dealer be dealt an Ace of spades in round one, the game ends and the dealer wins the game. If betting, the respective player loses all bets placed. Similarly, should a player be dealt an Ace of spades in round one, the game ends and the player wins the game. If betting, the respective player wins the war bet and all other bets placed according to the house pay table rules. If multiple decks are used at the pre-play deck position 30, and if both the dealer and the player are dealt an Ace of spades, the dealer will draw a new card from the pre-play action position 32 and whoever has the highest Action Card value wins the round. If the results are still tied, the dealer wins. If a sweet bet is placed at position 88 and the player is not ahead 1-0 in points against the dealer, the player loses the sweep bet.

With continued reference to FIG. 2, an example round two will now be described. At the end of round one, one additional card from the pre-play deck position 30 is dealt to the player, face up, at the round two player card position 56. Similarly, one additional card from the pre-play deck position 30 is dealt to the dealer, face up, at the round two dealer card position 54. Whoever has the closest value to twenty-one based on the values given to each of their first two cards wins round two. In the event of a tie, victory goes to the dealer. In the example shown, a 5 of hearts is revealed at position 56 while a 7 of clubs is revealed at position 54. Because the total summed value of the cards in positions 50 and 54 is "20" while the total value of the summed cards in positions 52 and 56 is "8", the dealer wins round two. As identified earlier, round two can be alternatively treated as another unique war round. In that alternative example, the dealer would win round two as a "7" is greater than a "5".

If a sweep bet is placed at position 88 and the player is not ahead 2-0 in points after round two against the dealer, the player loses the sweep bet. If a 21 bet is placed at position 82 and the player has exactly the value of twenty-one for the sum of the cards in positions 52 and 56, the player wins the 21 bet. If the player does not have the value of exactly twenty-one for the sum of the cards in positions 52 and 56, the player loses the 21 bet.

With continued reference to FIG. 2, an example round three will now be described. At the end of round two, one additional card from the pre-play deck position 30 is dealt to the player, face up, at the round three player card position 62. Similarly, one additional card from the pre-play deck position 30 is dealt to the dealer, face up, at the round three dealer card position 60. The player's three cards from positions 52, 56 and 62 are combined to form the player's three-card stud poker hand. The dealer's three cards from positions 50, 54 and 60 are combined to form the dealer's three-card stud poker hand. If the player has the best three-card stud poker hand, the player wins round three. If the dealer has the best three-card stud poker hand, the dealer wins round three. In the event that the player's three-card stud poker hand and the dealer's three-card stud poker hand have equal rank, the point goes to the dealer.

If a sweep bet is placed at position 88 and the player is not ahead 3-0 in points after round three against the dealer, the player loses the sweep bet. If a three-card bonus bet is placed at position 84 and the player's three cards qualify for a winning three-card bonus hand, the player wins the three-card bonus bet. If a three-card bonus bet is placed at position 84 and the player's three cards do not qualify for a winning three-card bonus hand, the player loses the three-card bonus bet. If the dealer is ahead 3-0 in points against the player after round three, the game is over and the player loses the game. Additionally, the player loses the Ante bet. If the player is ahead 3-0 in points against the dealer after round three, the game is over and the player wins the game. Additionally, the player wins the Ante bet. If a sweep bet or a five-card bonus bet were placed at 88 and/or 86, the game continues to the fourth round without any bearing to the Ante war bet outcome.

With continued reference to FIG. 2, an example round four will now be described. At the end of round three, one additional card from the pre-play deck position 30 is dealt to the player, face up, at the round four player card position 66. Similarly, one additional card from the pre-play deck position 30 is dealt to the dealer, face up, at the round four dealer card position 64. In the example shown, a 9 of hearts is revealed at position 66 while a 4 of clubs is revealed at position 64. Because the card at position 66 (9 of hearts) is greater than the card at position 64 (4 of clubs), the player wins round four and round four ends. If the result is the same card value, the victory goes to the dealer. If either the player or dealer was alternatively dealt a 2 value card, the dealer will draw a new card from the pre-play action position 32 and apply the Action Card to the 2 value card (player's and/or dealer's). The Action Card value is added to the 2 value card and the resulting sum is the total value for either the player or the dealer (instead of just a 2 value), as described above.

If the dealer is ahead 3-1 in points against the player, the game is over and the player loses the game. The player also loses the Ante bet. If the player is ahead 3-1 in points against the dealer, the game is over and the player wins the game. The player also wins the Ante bet. If a five-card bonus bet is placed at position 86, the game continues to round five, but not bearing to the Ante war bet outcome. If a sweep bet is placed at position 88 and the player is not ahead 4-0 in points after round four against the dealer, the player loses the sweep bet.

With continued reference to FIG. 2, an example round five will now be described. At the end of round four, one additional card from the pre-play deck position 30 is dealt to the player, face up, at the round five player card position 72. Similarly, one additional card from the pre-play deck position 30 is dealt to the dealer, face up, at the round four dealer card position 70. In the example shown, a king of hearts is revealed at position 72 while a 5 of clubs is revealed at position 70. The player's five cards from positions 52, 56, 62, 66 and 72 are combined to form the player's five-card stud poker hand. The dealer's five cards from positions 50, 54, 60, 64 and 70 are combined to form the dealer's five-card stud poker hand. If the player has the best five-card stud poker hand, the player wins round five. If the dealer has the best five-card stud poker hand, the dealer wins round five. In the example shown, the player has the higher five-card stud poker hand and the player wins round five. Therefore, in the example shown in FIG. 2, the player wins by the score of 3-2. The player won round three (highest poker hand), round four (higher valued card), and round five (highest poker hand). If a five-card bonus bet is placed at position 86 and the player's five cards qualify for a winning five-card bonus hand, the player wins the five-card bonus bet. If a five-card bonus bet is placed at position 86 and the player's five cards do not qualify for a winning five-card bonus hand, the player loses the five-card bonus bet. If a sweep bet is placed at position 88 and the player is not ahead 5-0 in points after round five against the dealer, the player loses the sweep bet.

Figure 3:
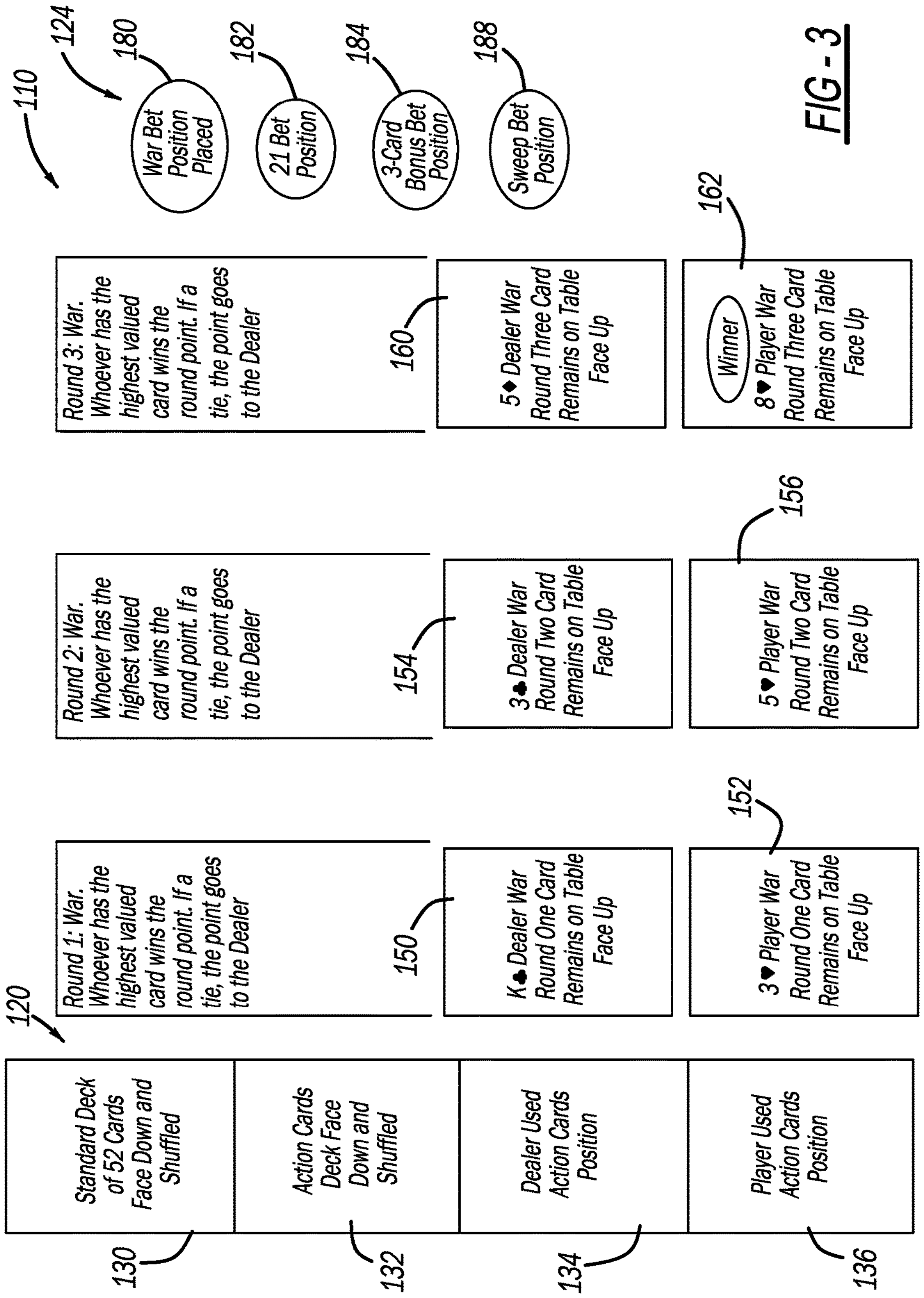
FIG. 3 is a plan view of the War Poker game table of FIG. 1 subsequent to a three round version of play including a first war round, a second war round, and a third war round.

Turning now to FIG. 3, an exemplary sequence of playing War Poker according to a second example will be described. In the example shown in FIG. 3, three rounds are played. The dealer will deal cards to the participating players starting from their left-most position and end at the right-most position. Unless otherwise described herein, like features are identified with like reference numerals increased by 100 from the example shown in FIG. 2.

At predetermined and agreed upon steps in the game there will be an opportunity to draw from the Action Cards at position 132. It is contemplated that, as described above, if the player or the dealer receives a 2-value card, they are entitled to supplement that 2-value with a newly drawn Action Card from position 132. The war bet is the Ante bet, placed at position 180. The Ante bet is required to be placed for the player to participate in the game in the betting format. The player must win at least two rounds to win the bet. The payout on a winning bet will be determined by the hosting entity of the game according to their rules and pay table. Various proposition bets may be placed prior to game play. In this regard, once game play starts, no more proposition bets can be placed by the player until a new game begins.

Example proposition bets available for the War Poker game of FIG. 3 include a 21 bet, a three-card bonus bet, and a sweep bet. Such bets can be placed at positions 182, 184, and 188, respectively.

One card is dealt to a first player from the pre-play deck position 130, face up, at the player war round one position 152 and another card is dealt to the dealer from the pre-play deck position 130, face up, at the dealer war round one card position 150. The dealer then compares their round one card to the player's round one card. Whoever has the highest value wins the round according to the predetermined and agreed upon point values and rules. In the example shown, a 3 of hearts is revealed at position 152 while a king of clubs is revealed at position 150. Because the card at position 150 (king of clubs) is greater than the card at position 152 (3 of hearts), the dealer wins round one and round one ends. If the result is the same card value, the victory goes to the dealer.

With continued reference to FIG. 3, an example round two will now be described. At the end of round one, one additional card from the pre-play deck position 130 is dealt to the player, face up, at the round two player card position 156. Similarly, one additional card from the pre-play deck position 130 is dealt to the dealer, face up, at the round two dealer card position 154. In the example shown, a 5 of hearts is revealed at position 156 while a 3 of clubs is revealed at position 154. Because the card at position 156 (5 of hearts) is greater than the card at position 154 (3 of clubs), the player wins round two and round two ends. If the result is the same card value, the victory goes to the dealer.

With continued reference to FIG. 3, an example round three will now be described. At the end of round two, one additional card from the pre-play deck position 130 is dealt to the player, face up, at the round two player card position 162. Similarly, one additional card from the pre-play deck position 130 is dealt to the dealer, face up, at the round two dealer card position 160. In the example shown, an 8 of hearts is revealed at position 162 while a 5 of diamonds is revealed at position 160. Because the card at position 162 (8 of hearts) is greater than the card at position 160 (5 of diamonds), the player wins round three and round three ends. If the result is the same card value, the victory goes to the dealer. In the example described, the player wins the game by the score of 2-1 as a result of winning rounds two and three. If a 21 bet is placed at position 182 and the player has exactly the value of twenty-one for the sum of the cards in positions 152 and 156, the player wins the 21 bet. If the player does not have the value of exactly twenty-one for the sum of the cards in positions 152 and 156, the player loses the 21 bet. If a three-card bonus bet is placed at position 184 and the player's three cards qualify for a winning three-card bonus hand, the player wins the three-card bonus bet. If a three-card bonus bet is placed at position 184 and the player's three cards do not qualify for a winning three-card bonus hand, the player loses the three-card bonus bet. If a sweep bet is placed at position 188 and the player is not ahead 3-0 in points after round three against the dealer, the player loses the sweep bet.

At predetermined and agreed upon steps in the game there will be an opportunity to draw from the Action Cards at position 132. It is contemplated that, as described above, if the player or the dealer receives a 2-value card, during any round, they are entitled to supplement that 2-value with a newly drawn Action Card from position 132.

Figure 4:
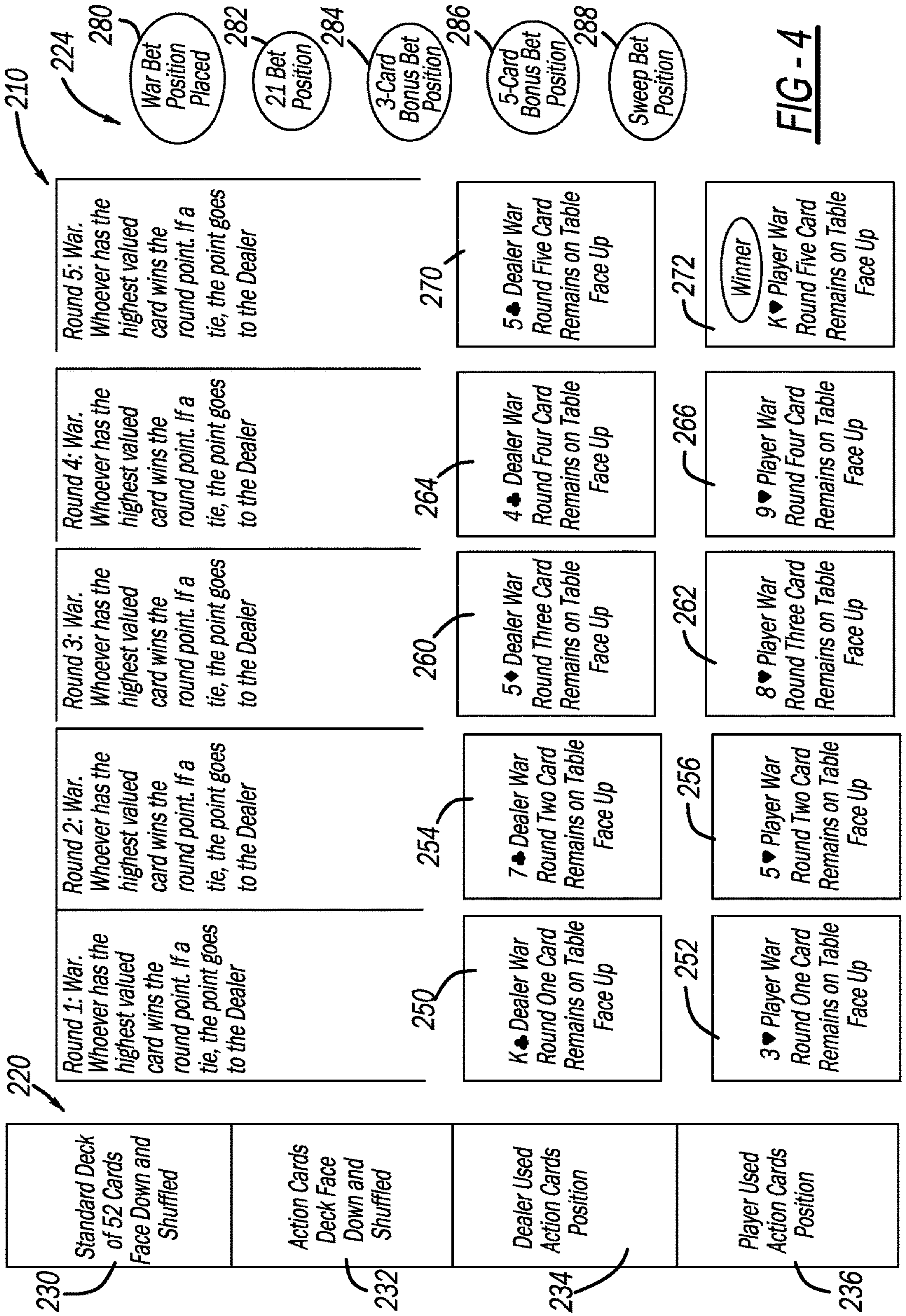
FIG. 4 is a plan view of the War Poker game table of FIG. 1 subsequent to a second five round version of play including a first war round, a second war round, a third war round, a fourth war round and a fifth war round.

Turning now to FIG. 4, an exemplary sequence of playing War Poker according to a third example will be described. In the example shown in FIG. 3, five rounds are played. The dealer will deal cards to the participating players starting from their left-most position and end at the right-most position. Unless otherwise described herein, like features are identified with like reference numerals increased by 200 from the example shown in FIG. 2.

At predetermined and agreed upon steps in the game there will be an opportunity to draw from the Action Cards at position 232. It is contemplated that, as described above, if the player or the dealer receives a 2-value card, they are entitled to supplement that 2-value with a newly drawn Action Card from position 232. The war bet is the Ante bet, placed at position 280. The Ante bet is required to be placed for the player to participate in the game in the betting format. The player must win at least three rounds to win the bet. The payout on a winning bet will be determined by the hosting entity of the game according to their rules and pay table. Various proposition bets may be placed prior to game play. In this regard, once game play starts, no more proposition bets can be placed by the player until a new game begins. Example proposition bets available for the War Poker game of FIG. 4 include a 21 bet, a three-card bonus bet, a five-card bonus bet, and a sweep bet. Such bets can be placed at positions 282, 284, 286 and 288, respectively.

One card is dealt to a first player from the pre-play deck position 230, face up, at the player war round one position 252 and another card is dealt to the dealer from the pre-play deck position 230, face up, at the dealer war round one card position 250. The dealer then compares their round one card to the player's round one card. Whoever has the highest value wins the round according to the predetermined and agreed upon point values and rules. In the example shown, a 3 of hearts is revealed at position 252 while a king of clubs is revealed at position 250. Because the card at position 250 (king of clubs) is greater than the card at position 252 (3 of hearts), the dealer wins round one and round one ends. If the result is the same card value, the victory goes to the dealer.

With continued reference to FIG. 4, an example round two will now be described. At the end of round one, one additional card from the pre-play deck position 230 is dealt to the player, face up, at the round two player card position 256. Similarly, one additional card from the pre-play deck position 230 is dealt to the dealer, face up, at the round two dealer card position 254. In the example shown, a 5 of hearts is revealed at position 256 while a 7 of clubs is revealed at position 254. Because the card at position 254 (7 of clubs) is greater than the card at position 256 (5 of hearts), the dealer wins round two and round two ends. If the result is the same card value, the victory goes to the dealer.

With continued reference to FIG. 4, an example round three will now be described. At the end of round two, one additional card from the pre-play deck position 230 is dealt to the player, face up, at the round three player card position 262. Similarly, one additional card from the pre-play deck position 230 is dealt to the dealer, face up, at the round three dealer card position 260. In the example shown, an 8 of hearts is revealed at position 262 while a 5 of diamonds is revealed at position 260. Because the card at position 262 (8 of hearts) is greater than the card at position 260 (5 of diamonds), the player wins round three and round three ends. If the result is the same card value, the victory goes to the dealer.

With continued reference to FIG. 4, an example round four will now be described. At the end of round three, one additional card from the pre-play deck position 230 is dealt to the player, face up, at the round four player card position 266. Similarly, one additional card from the pre-play deck position 230 is dealt to the dealer, face up, at the round four dealer card position 264. In the example shown, a 9 of hearts is revealed at position 266 while a 4 of clubs is revealed at position 264. Because the card at position 266 (9 of hearts) is greater than the card at position 264 (4 of clubs), the player wins round four and round four ends. If the result is the same card value, the victory goes to the dealer.

With continued reference to FIG. 4, an example round five will now be described. At the end of round three, one additional card from the pre-play deck position 230 is dealt to the player, face up, at the round five player card position 272. Similarly, one additional card from the pre-play deck position 230 is dealt to the dealer, face up, at the round five dealer card position 270. In the example shown, a king of hearts is revealed at position 272 while a 5 of clubs is revealed at position 270. Because the card at position 272 (king of hearts) is greater than the card at position 270 (5 of clubs), the player wins round five and round fiver ends. If the result is the same card value, the victory goes to the dealer. In the example described, the player wins the game by the score of 3-2 as a result of winning rounds three, four and five. If a 21 bet is placed at position 282 and the player has exactly the value of twenty-one for the sum of the cards in positions 252 and 256, the player wins the 21 bet. If the player does not have the value of exactly twenty-one for the sum of the cards in positions 252 and 256, the player loses the 21 bet. If a three-card bonus bet is placed at position 284 and the player's three cards qualify for a winning three-card bonus hand, the player wins the three-card bonus bet. If a three-card bonus bet is placed at position 284 and the player's three cards do not qualify for a winning three-card bonus hand, the player loses the three-card bonus bet. If a five-card bonus bet is placed at position 286 and the player's five cards qualify for a winning five-card bonus hand, the player wins the five-card bonus bet. If a five-card bonus bet is placed at position 286 and the player's five cards do not qualify for a winning five-card bonus hand, the player loses the five-card bonus bet. If a sweep bet is placed at position 288 and the player is not ahead 5-0 in points after round five against the dealer, the player loses the sweep bet.

Figure 5:
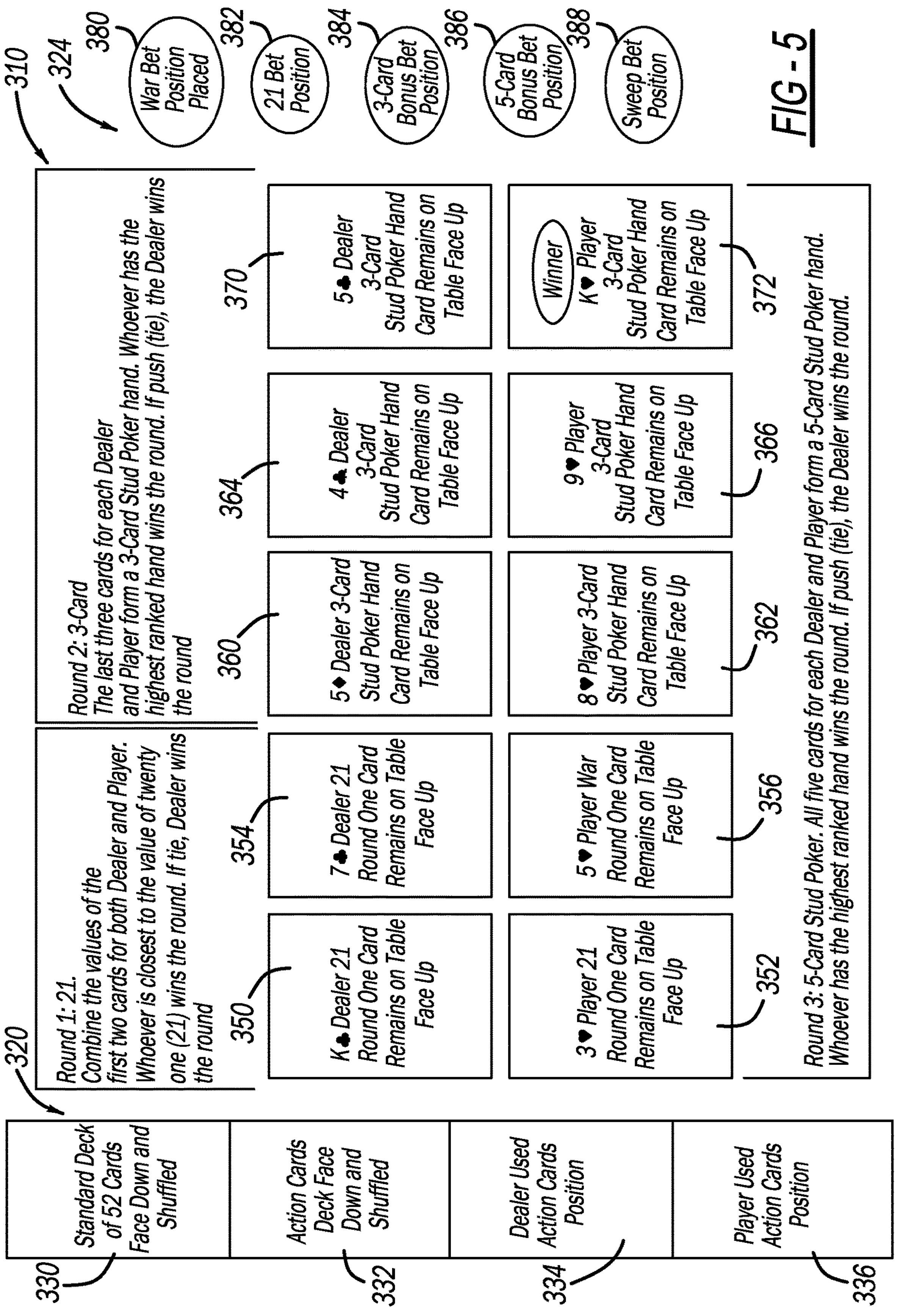
FIG. 5 is a plan view of the War Poker game table of FIG. 1 subsequent to a three round version of play including a first twenty-one round, a second three-card stud poker round, and a third five-card stud poker round.

Turning now to FIG. 5, an exemplary sequence of playing War Poker according to a fourth example will be described. In the example shown in FIG. 5, three rounds are played. The dealer will deal cards to the participating players starting from their left-most position and end at the right-most position. Unless otherwise described herein, like features are identified with like reference numerals increased by 300 from the example shown in FIG. 2.

At predetermined and agreed upon steps in the game there will be an opportunity to draw from the Action Cards at position 332. It is contemplated that, as described above, if the player or the dealer receives a 2-value card, they are entitled to supplement that 2-value with a newly drawn Action Card from position 332. The war bet is the Ante bet, placed at position 380. The Ante bet is required to be placed for the player to participate in the game in the betting format. The player must win at least two rounds to win the bet. The payout on a winning bet will be determined by the hosting entity of the game according to their rules and pay table. Various proposition bets may be placed prior to game play. In this regard, once game play starts, no more proposition bets can be placed by the player until a new game begins. Example proposition bets available for the War Poker game of FIG. 5 include a 21 bet, a three-card bonus bet, a five-card bonus bet, and a sweep bet. Such bets can be placed at positions 382, 384, 386 and 388, respectively.

One card is dealt to a first player from the pre-play deck position 330, face up, at the player first position 352 and another card is dealt to the dealer from the pre-play deck position 330, face up, at the dealer first position 350. Next, another card is dealt to the player second position 356 and another card is dealt to the dealer at the dealer second position 354. Round one comprises the combined value of the first two cards. Whoever is closest to the value of twenty-one wins the round. In the example shown, a 3 of hearts is revealed at position 352 while a king of clubs is revealed at position 350. A 5 of hearts is revealed at position 356 while a 7 of clubs is revealed at position 354. Because the combined dealer score of positions 350 and 354 (twenty), is closer to twenty-one than the combined player score of positions 352 and 356 (eight), the dealer wins round one and round one ends. If a tie, the dealer wins the round.

With continued reference to FIG. 5, an example round two will now be described. Round two is a three-card stud poker round. At the end of round one, one additional card from the pre-play deck position 330 is dealt to the player, face up, at the player card position 362. Similarly, one additional card from the pre-play deck position 330 is dealt to the dealer, face up, at the dealer card position 360. Next, another additional card from the pre-play deck position 330 is dealt to the player, face up, at the player card position 366. Similarly, one additional card from the pre-play deck position 330 is dealt to the dealer, face up, at the dealer card position 364. Next, another additional card from the pre-play deck position 330 is dealt to the player, face up, at the player card position 372. Similarly, one additional card from the pre-play deck position 330 is dealt to the dealer, face up, at the dealer card position 370.

The three-card collection for the player from positions 362, 366 and 372 make up a three-card stud poker hand for the player. Similarly, the three-card collection for the dealer from positions 360, 364 and 370 make up a three-card stud poker hand for the dealer. If the player has the best three-card stud poker hand, the player wins round two. If the dealer has the best three-card stud poker hand, the dealer wins round two. If there is a tie value outcome, where both the dealer and the player have the same valued hand rank, the dealer will be awarded the round victory. In the example shown in FIG. 5, the player has a better three-card stud poker with a flush, having the 8, 9 and king all of hearts.

With continued reference to FIG. 5, an example round three will be described. Round three for the example in FIG. 5 requires no additional cards to be drawn from the position 330. Instead, the five-card collection for the player from positions 352, 356, 362, 366 and 372 make up a five-card stud poker hand for the player. Similarly, the five-card collection for the dealer from positions 350, 354, 360, 364 and 370 make up a five-card stud poker hand for the dealer. If the player has the best five-card stud poker hand, the player wins round five. If the dealer has the best five-card stud poker hand, the dealer wins round five. If there is a tie value outcome, the dealer will be awarded the round three victory. At this point, the War Poker game according to the example shown in FIG. 5 has concluded. If the player has won a majority of rounds one, two and three, the player wins the game. If the dealer has won a majority of rounds one, two and three, the dealer wins the game. It is contemplated that if either of the player or the dealer has won both of rounds one and two, the best five-card stud poker hand need not be determined.

Figure 6A:
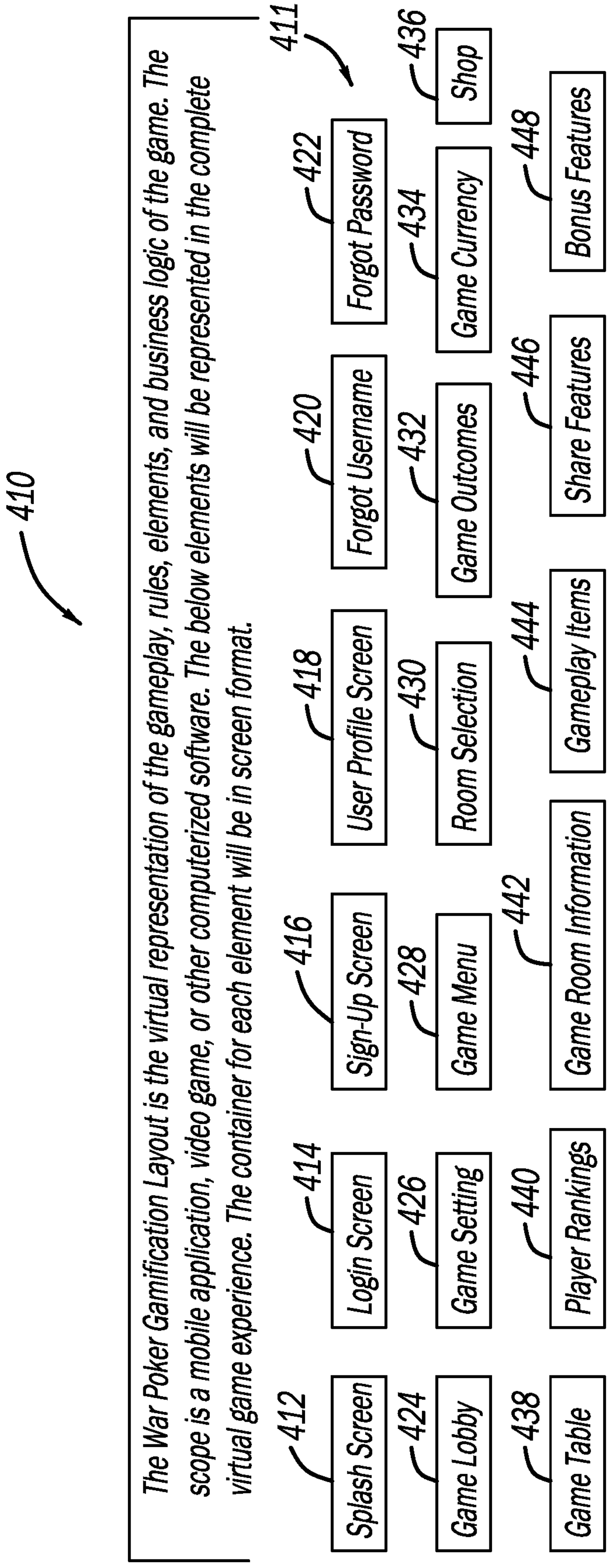
FIG. 6A is a plan view of a first gamification layout including a virtual representation of gameplay, rules, elements and business logic according to one example of the present disclosure.

With reference now to FIG. 6A, a first gamification layout including a virtual representation of gameplay, rules, elements and business logic according to one example of the present disclosure is shown and generally identified at reference 410. It will be appreciated that the scope of the gamification layout encompasses various physical and virtual implementations of War Poker. By way of example, the gamification layout 410 includes interfaces, collectively identified at 411, for user interaction. The interfaces 411 include a splash screen 412, a login screen 414, a sign-up screen 416, a user profile screen 418, a forgot username interface 420, a forgot password interface 422, a game lobby interface 424, a game setting interface 426, a game menu interface 428, a room selection interface 430, a game outcomes interface 434, a game currency interface 434, a shop interface 436, a game table interface 438, a player rankings interface 440, a game room information interface 442, a gameplay items interface 444, a share features interface 446 and a bonus features interface 448. Each interface 411 can be in screen format and will allow a user to provide inputs to modify various criteria related to the game.

Figure 7:
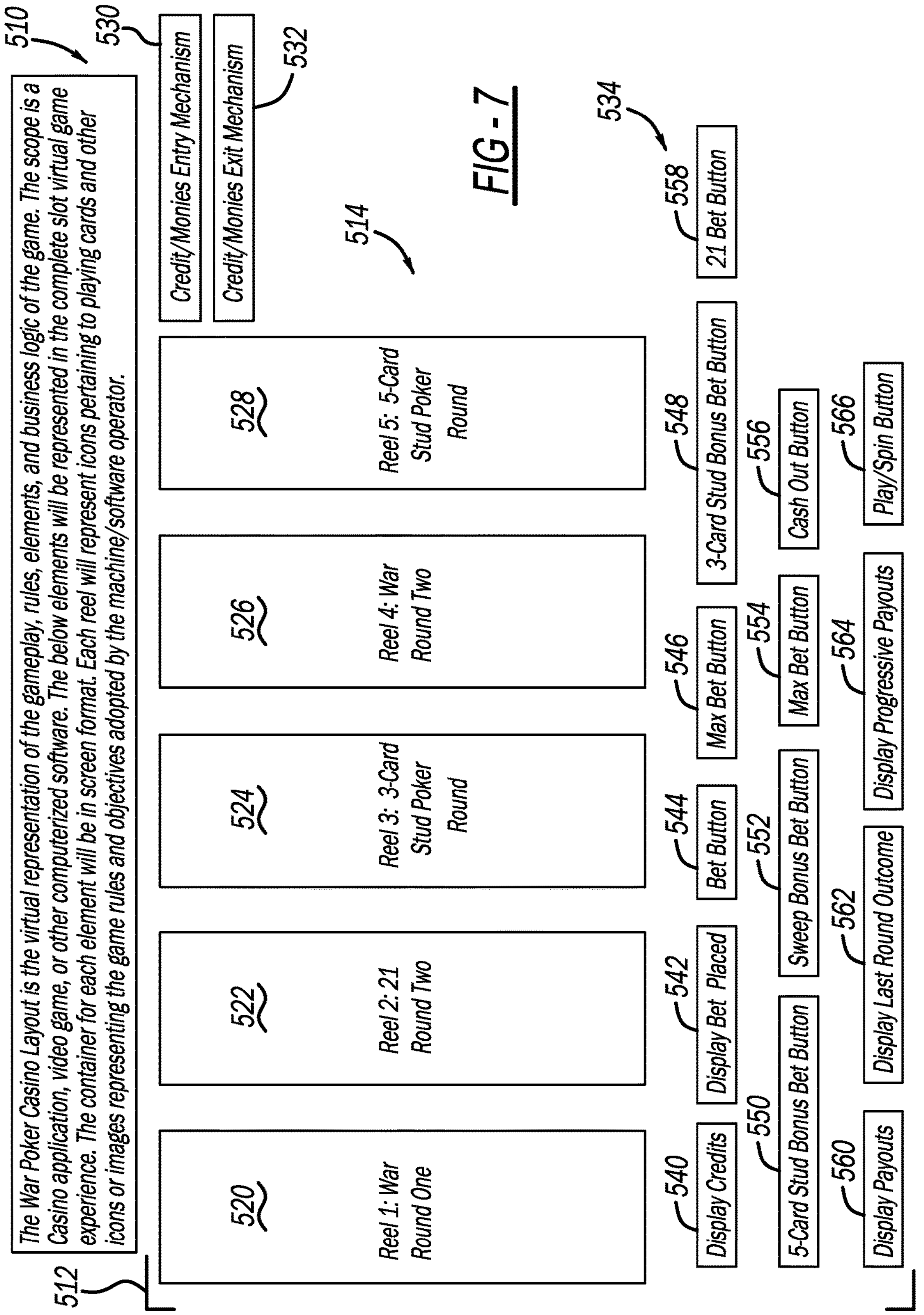
FIG. 7 is a plan view of a first casino layout adapted to slots including a virtual representation of gameplay, rules, elements and business logic according to one example of the present disclosure.

With reference now to FIG. 7, the Casino implementation of the present disclosure will be described. The scope is to implement the game in various popular Casino gaming formats to extend gameplay options and variations of the game. The changes will be implemented using physical parts/machinery or for a video game/application/computer software or other virtual experience and not traditional/physical card/table play.

The Casino Version of War Poker will alter certain aspects of the original gameplay. Each version will need to have various elements pertaining to its form that emulate popular Casino gaming playthroughs that do not translate equally with the game's original physical table format.

All Casino versions of War Poker will offer gambling mechanisms becoming a game of chance to win the monies put into and won from the game. The game will require certain monies and/or credits to be available and put into the game to begin gameplay. The required money amounts and/or credits will be determined by the host/house/operator of the game and can be updated or changed as required. There will be multiple versions of War Poker Casino. The main and popular version will be gaming slots. The other versions will be Video Poker Gaming or other versions of each.

Figure 6B:
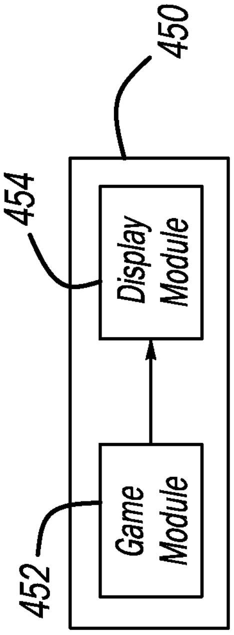
FIG. 6B is a schematic illustration of a game system having a game module and a display module configured to execute instructions consistent with the various rules of War Poker described herein.

FIG. 6B is a schematic illustration of a game system 450 having a game module 452 and a display module 454 configured to execute instructions consistent with the various rules of War Poker described herein. The game module 452 and display module 454 can include software, hardware, mechanical mechanisms, or a combination thereof in an embodiment of the present invention, in accordance with the context in which the term is used. For example, the software can be machine code, firmware, embedded code, or application software. Also, for example, the hardware can be circuitry, a processor, a special purpose computer, an integrated circuit, integrated circuit cores, a pressure sensor, an inertial sensor, a microelectromechanical system (MEMS), a passive device, or a combination thereof.

Turning now to FIG. 7, a first casino layout adapted to slots including a virtual representation of gameplay, rules, elements and business logic according to one example of the present disclosure is shown and generally identified at reference numeral 510. The first casino layout 510 is shown implemented on a slot machine 512. The slots version of War Poker Casino will be a computer or physical machine hosting the game in its form. In this regard, the scope of the casino layout 510 includes a physical slots machine, or a virtual screen (phone, tablet, computer, etc.).

All game actions and steps/buttons will be executed in the virtual representation of the game through the machine. The format will include multiple reels collectively identified at 514. The reels 514 include a first reel 520, a second reel 522, a third reel 524, a fourth reel 526 and a fifth reel 528. The layout 510 includes a multiple reel view with a single player triggering a reel spin either physically or virtually resulting in a random result at the end of the spin which will determine the overall outcome of the game. As can be appreciated, any of the War Poker game versions discussed above can be configured for play on the slot machine 512. It will be further appreciated that the slot machine 512 can be adapted for use with War Poker games having fewer than five game rounds by configuration with different amounts of reels.

There will be physical and/or virtual buttons for placing one or more bets and/or retrieving monies won. In the example shown, a credit/monies entry mechanism interface 530 and a credit/monies exit mechanism interface 532 are provided. Other virtual and/or physical buttons may be present as required by the purchasing and/or hosted party that operate the machine. By way of example, the casino layout 510 includes interfaces, collectively identified at 534, for user interaction. The interfaces 534 include a display credits interface 540, a display bet placed interface 542, a bet button interface 544, a max bet button interface 546, a three-card stud bonus bet button interface 548, a five-card stud bonus bet button interface 550, a sweep bonus bet button interface 552, a max bet button interface 554, a cash out button interface 556, a 21 bet button 558, a display payouts interface 560, a display last round outcome interface 562, a display progressive payouts interface 564 and a play/spin button interface 566. The interfaces 534 allow the user to make changes and/or view status of various implementations of the game. The results of interacting with the interfaces 534 are meant to take the plain meaning according to casino terminology.

Figure 8:
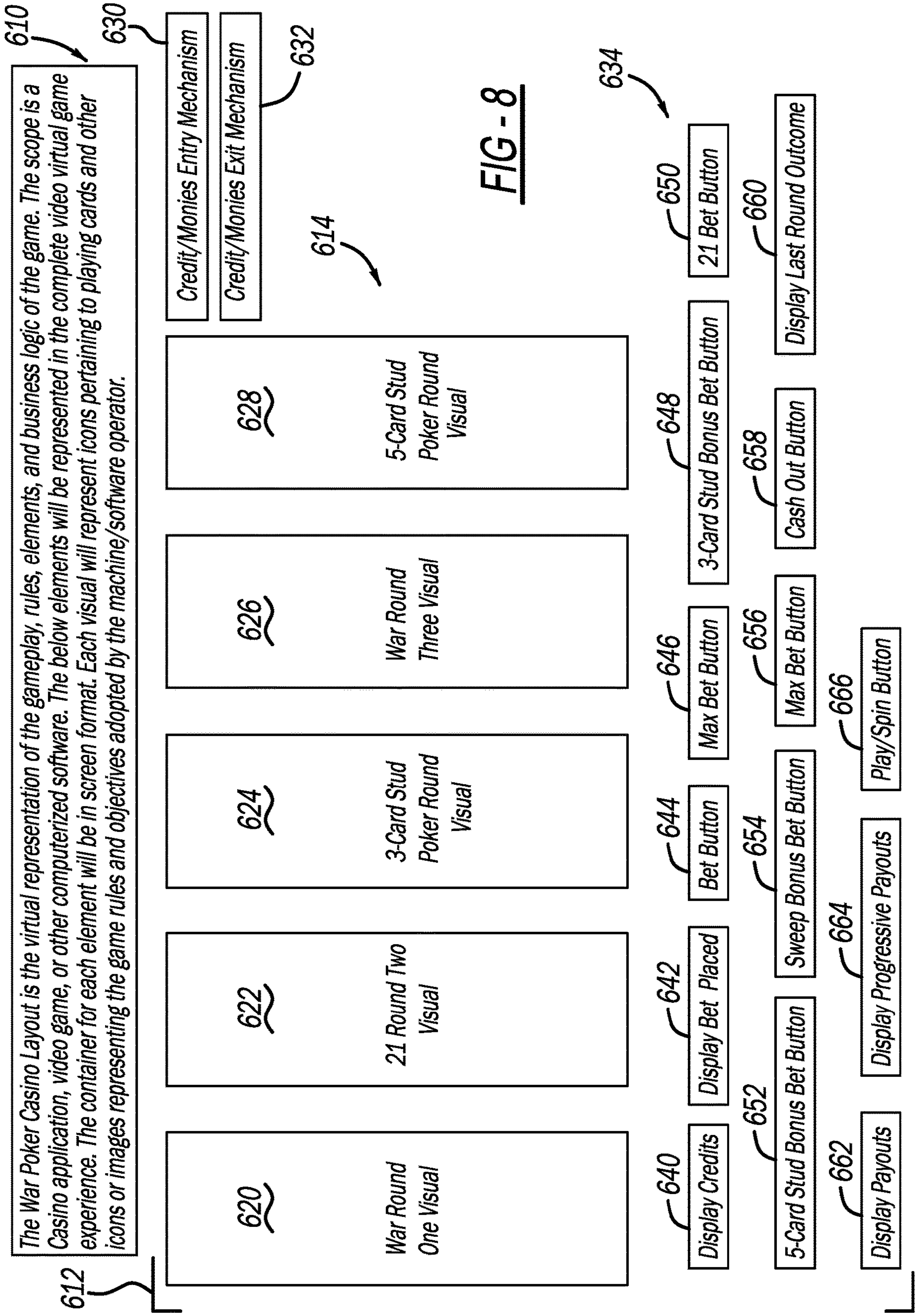
FIG. 8 is a plan view of a second casino layout adapted to video poker including a virtual representation of gameplay, rules, elements and business logic according to one example of the present disclosure.

Turning now to FIG. 8, a second casino layout adapted to a virtual video game including a virtual representation of gameplay, rules, elements and business logic according to one example of the present disclosure is shown and generally identified at reference numeral 610. The second casino layout 610 is shown implemented as a virtual game on a display screen 612. The video version of War Poker Casino will be a computer or physical machine hosting the game in its form. In this regard, the scope of the casino layout 610 includes a virtual user interface by way of the display screen 612 (phone, tablet, computer, etc.).

All game actions and steps/buttons will be executed in the virtual representation of the game through the screen 612. The format will include the screen 612 that displays multiple reels collectively identified at 614. The reels 614 include a first reel 620, a second reel 622, a third reel 624, a fourth reel 626 and a fifth reel 628. The layout 610 includes a multiple reel view with a single player triggering a reel spin either physically or virtually resulting in a random result at the end of the spin which will determine the overall outcome of the game. As can be appreciated, any of the War Poker game versions discussed above can be configured for play on the screen 612. It will be further appreciated that the screen 612 can be adapted for use with War Poker games having fewer than five game rounds by configuration with different amounts of reels.

There will be physical and/or virtual buttons for placing one or more bets and/or retrieving monies won. In the example shown, a credit/monies entry mechanism interface 630 and a credit/monies exit mechanism interface 632 are provided. Other virtual and/or physical buttons may be present as required by the purchasing and/or hosted party that operate the machine. By way of example, the casino layout 610 includes interfaces, collectively identified at 634, for user interaction. The interfaces 634 include a display credits interface 640, a display bet placed interface 642, a bet button interface 644, a max bet button interface 646, a three-card stud bonus bet button interface 648, a 21 bet button 650, a five-card stud bonus bet button interface 652, a sweep bonus bet button interface 654, a max bet button interface 656, a cash out button interface 658, a display last round outcome interface 660, a display payouts interface 662, a display progressive payouts interface 664 and a play/spin button interface 666. The interfaces 634 allow the user to make changes and/or view status of various implementations of the game. The results of interacting with the interfaces 634 are meant to take the plain meaning according to casino terminology.

For War Poker casino slots and virtual video game examples 510, 610, each individual reel of the reels 514, 614 may represent either one round of the War Poker individually or represent them all at the same time. For each round, the respective reel may also represent one dealer card position, one player card position, or both.

For the singular slot view, there will be a total of five unique reels. Each reel will have the same set of icons representing different aspects of the game such as card type, suit, rank, card bonus, etc. The goal is to obtain a winning round and/or hand when the reels stop spinning and whatever icons align according to the slot requirements for payout.

When a player starts the game, they will trigger the spinning motion for each reel. Each individual reel will spin in a singular manner, individually apart from each other. After a certain amount of time each reel will stop its spin, individually, starting left-most reel which represents round one, until the last reel representing the round five, five-card stud poker hand. Each reel will represent the win/play for each round according to the base game rules based on the reel icons displayed at stop. The player will be notified and rewarded if they qualify for winning outcomes and may also qualify for bonus winnings if applicable. The single slot view can be physical/mechanic and/or virtual in nature.

For the multiple slot view, there will be a total of five unique reels. Each reel will have the same set of icons representing different aspects of the game such as card type, suit, rank, card bonus, etc. The goal is to obtain a winning round and/or hand when the reels stop spinning and whatever icons align according to the slot requirements for payout.

When a player starts the game, they will trigger the spinning motion. All five reels will be spinning at the same time. After a certain amount of time the reel will stop its spin. Each division of the reel representing its respective round will represent the win/play for each Round according to the base game rules. The player will be notified and rewarded if they qualify for winning outcomes and may also qualify for bonus winnings if applicable. The multiple slot view can be physical/mechanic and/or virtual in nature.

The video gaming version of War Poker will be a virtual display of the game with the same or similar elements and user interface. All game actions and steps/buttons will be executed in the virtual representation of the game through the machine. There will be physical and/or virtual buttons for placing one or more bets and/or retrieving monies won. Other virtual and/or physical buttons may be present as required by the purchasing and/or hosted party that operate the machine. Casino Bonuses will apply according to the operator of the specific machines. Bonuses will apply to the outcome of the game based on the alignments of the reels and/or video projections of icons representing game rules.

The foregoing description of the many examples has been provided for purposes of illustration and description. It is not intended to be exhaustive or to limit the disclosure. Individual elements or features of a particular aspect are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A game system comprising:

a game module having a computer readable medium configured to execute instructions and render graphics on a visual display, the game module executing instructions comprising:

selecting a first card from the standard deck of cards and assigning it to the first player as rendered first card graphics on the visual display;

selecting a second card from the standard deck of cards and assigning it to the dealer as rendered second card graphics on the visual display;

determining whether the first or the second card is equal to an actionable value card and, based on the first or the second card being equal to an actionable value card:

selecting and graphically displaying an Action card from an Action Cards deck of cards, separate from the standard deck of cards;

replacing a value of the first or the second card based on the selected Action card; and displaying graphically the replaced value of the first or the second card based on the selected Action card;

determining whether the first card or the second card has a higher value and assigning a first point to the respective recipient of the higher value card of the first and second cards;

displaying graphics on the visual display indicating a winner of the first point;

selecting a third card from the standard deck of cards and assigning it to the first player as rendered third card graphics on the visual display;

selecting a fourth card from the standard deck of cards and assigning it to the dealer as rendered fourth card graphics on the visual display;

determining whether the third or the fourth card is equal to an actionable value card and, based on the third or the fourth card being equal to an actionable value card:

selecting and graphically displaying an Action card from the Action Cards deck of cards;

replacing a value of the third or the fourth card based on the selected Action card; and displaying graphically the replaced value of the third or the fourth card based on the selected Action card;

determining whether a sum of the first and the third cards or a sum of the second and the fourth cards has a closer value to twenty-one and assigning a second point to the respective recipient of the value closer to twenty-one;

displaying graphics on the visual display indicating a winner of the second point;

selecting a fifth card from the standard deck of cards and assigning it to the first player as rendered fifth card graphics on the visual display;

selecting a sixth card from the standard deck of cards and assigning it to the dealer as rendered sixth card graphics on the visual display;

determining whether the first, third and fifth combination of cards to the first player or the second, fourth and sixth combination of cards to the dealer has a higher three-card stud poker hand;

assigning a third point to the respective recipient of the higher three-card stud poker hand;

displaying graphics on the visual display indicating a winner of the third point;

selecting a seventh card from the standard deck of cards and assigning it to the first player as rendered seventh card graphics on the visual display;

selecting an eighth card from the standard deck of cards and assigning it to the dealer as rendered eighth card graphics on the visual display;

determining whether the seventh or the eighth card is equal to an actionable value card and, based on the seventh or the eighth card being equal to an actionable value card:

selecting and graphically displaying an Action card from the Action Cards deck of cards;

replacing a value of the seventh or the eighth card based on the selected Action card; and displaying graphically the replaced value of the seventh or the eighth card based on the selected Action card;

determining whether the seventh card or the eighth card has a higher value and assigning a fourth point to the respective recipient of the higher value card of the seventh and eighth cards;

displaying graphics on the visual display indicating a winner of the fourth point;

selecting a ninth card from the standard deck of cards and assigning it to the first player as rendered ninth card graphics on the visual display;

selecting a tenth card from the standard deck of cards and assigning it to the dealer as rendered tenth card graphics on a visual display;

determining whether the first, third, fifth, seventh and ninth combination of cards to the first player or the second, fourth, sixth, eighth and tenth combination of cards to the dealer has a higher five-card stud poker hand; and assigning a fifth point to the respective recipient of the higher five-card stud poker hand;

displaying graphics on the visual display indicating a winner of the fifth point;

determining a winner between the first player and the dealer based on an accumulation of a majority of the first through fifth points; and displaying graphics on the visual display indicating a game winner.

2. The game system of claim 1, wherein replacing the value of the first, second, third, fourth, seventh or eighth card based on the selected Action card comprises one of adding, subtracting or replacing a value of the selected Action Card to the respective actionable value card.

3. The game system of claim 2 wherein the actionable value card is a card having a value of two.

4. The game system of claim 1 wherein the closer value to twenty-one includes summed values below and over twenty-one, wherein a Jack face card will be scored with an 11 value, a Queen face card will be scored with a 12 value, a King face card will be scored with a 13 value and an Ace card will be scored a 14.

5. The game system of claim 1 wherein the Action cards deck of cards comprises a +3 value card, a +5 value card, a +8 value card and a +12 value card.

6. A non-transitory computer readable medium including instructions executable by a control circuit for a computer system that renders graphics on a visual display, the non-transitory computer readable medium executing instructions comprising:

selecting a first card from a standard deck of cards and assigning it to the first player as rendered first card graphics on the visual display;

selecting a second card from the standard deck of cards and assigning it to the dealer as rendered second card graphics on the visual display;

determining whether the first or the second card is equal to an actionable value card and, based on the first or the second card being equal to an actionable value card:

selecting and graphically displaying an Action card from an Action Cards deck of cards, separate from the standard deck of cards;

replacing a value of the first or the second card based on the selected Action card; and displaying graphically the replaced value of the first or the second card based on the selected Action card;

determining whether the first card or the second card has a higher value and assigning a first point to the respective recipient of the higher value card of the first and second cards;

displaying graphics on the visual display indicating a winner of the first point;

selecting a third card from the standard deck of cards and assigning it to the first player as rendered third card graphics on the visual display;

selecting a fourth card from the standard deck of cards and assigning it to the dealer as rendered fourth card graphics on the visual display;

determining whether the third or the fourth card is equal to an actionable value card and, based on the third or the fourth card being equal to an actionable value card:

selecting and graphically displaying an Action card from the Action Cards deck of cards;

replacing a value of the third or the fourth card based on the selected Action card; and displaying graphically the replaced value of the third or the fourth card based on the selected Action card;

determining whether a sum of the first and the third cards or a sum of the second and the fourth cards has a closer value to twenty-one and assigning a second point to the respective recipient of the value closer to twenty-one;

displaying graphics on the visual display indicating a winner of the second point;

selecting a fifth card from the standard deck of cards and assigning it to the first player as rendered fifth card graphics on the visual display;

selecting a sixth card from the standard deck of cards and assigning it to the dealer as rendered sixth card graphics on the visual display;

determining whether the first, third and fifth combination of cards to the first player or the second, fourth and sixth combination of cards to the dealer has a higher three-card stud poker hand;

assigning a third point to the respective recipient of the higher three-card stud poker hand;

displaying graphics on the visual display indicating a winner of the third point selecting a seventh card from the standard deck of cards and assigning it to the first player as rendered seventh card graphics on the visual display;

selecting an eighth card from the standard deck of cards and assigning it to the dealer as rendered eighth card graphics on the visual display;

determining whether the seventh or the eighth card is equal to an actionable value card and, based on the seventh or the eighth card being equal to an actionable value card:

selecting and graphically displaying an Action card from the Action Cards deck of cards;

replacing a value of the seventh or the eighth card based on the selected Action card; and displaying graphically the replaced value of the seventh or the eighth card based on the selected Action card;

determining whether the seventh card or the eighth card has a higher value and assigning a fourth point to the respective recipient of the higher value card of the seventh and eighth cards;

displaying graphics on the visual display indicating a winner of the fourth point;

selecting a ninth card from the standard deck of cards and assigning it to the first player as rendered ninth card graphics on the visual display;

selecting a tenth card from the standard deck of cards and assigning it to the dealer as rendered tenth card graphics on a visual display;

determining whether the first, third, fifth, seventh and ninth combination of cards to the first player or the second, fourth, sixth, eighth and tenth combination of cards to the dealer has a higher five-card stud poker hand; and assigning a fifth point to the respective recipient of the higher five-card stud poker hand;

displaying graphics on the visual display indicating a winner of the fifth point;

determining a winner between the first player and the dealer based on an accumulation of a majority of the first through fifth points; and displaying graphics on the visual display indicating a game winner.

7. The non-transitory computer readable medium of claim 6 wherein:

replacing the value of the first, second, third, fourth, seventh or eighth card based on the selected Action card comprises one of adding, subtracting or replacing a value of the selected Action Card to the respective actionable value card.

8. The non-transitory computer readable medium of claim 6 wherein the actionable value card is a card having a value of two.

9. The non-transitory computer readable medium of claim 6 wherein the Action cards deck of cards comprises a +3 value card, a +5 value card, a +8 value card and a +12 value card.

* * * * *